United States Patent
Kinugasa et al.

(10) Patent No.: US 7,819,768 B2
(45) Date of Patent: Oct. 26, 2010

(54) HYDRAULIC CONTROL APPARATUS OF TRANSMISSION

(75) Inventors: Seiichi Kinugasa, Okazaki (JP); Kazuhito Enomoto, Nishio (JP); Kiyotomo Miura, Nishio (JP); Kazuyuki Noda, Handa (JP); Satoru Wakuta, Anjo (JP); Hiroatsu Endo, Toyota (JP); Masatoshi Adachi, Miyoshi-cho (JP); Masato Fujikawa, Toyota (JP); Kazuo Kawaguchi, Kasugai (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 960 days.

(21) Appl. No.: 11/651,547

(22) Filed: Jan. 10, 2007

(65) Prior Publication Data

US 2007/0173373 A1 Jul. 26, 2007

(30) Foreign Application Priority Data

Jan. 11, 2006 (JP) ............................. 2006-004245

(51) Int. Cl.
*F16H 3/72* (2006.01)
(52) U.S. Cl. ........................................................ 475/5
(58) Field of Classification Search ................ 475/5, 475/127; 477/158, 163
See application file for complete search history.

(56) References Cited

U.S. PATENT DOCUMENTS

| 4,388,844 A * | 6/1983 | Arai et al. ................... 475/127 |
| 5,074,167 A | 12/1991 | Yoshimura et al. |
| 5,776,030 A * | 7/1998 | Minowa et al. ............. 477/109 |
| 6,398,693 B1 * | 6/2002 | Kawamura .................. 477/158 |
| 2005/0137043 A1 | 6/2005 | Kinugasa et al. |

FOREIGN PATENT DOCUMENTS

| JP | A 07-56333 | 3/1995 |
| JP | A 07-077079 | 3/1995 |
| JP | A 07-083320 | 3/1995 |
| JP | A 2005-106149 | 4/2005 |
| JP | A 2005-133856 | 5/2005 |
| JP | A 2005-207303 | 8/2005 |
| JP | A 2005-313672 | 11/2005 |

* cited by examiner

*Primary Examiner*—Dirk Wright
(74) *Attorney, Agent, or Firm*—Oliff & Berridge, PLC (57) ABSTRACT

A hydraulic control apparatus for a transmission includes a line pressure regulating device that enables control in which an oil pressure from an oil pump is regulated so as to attain a line pressure, and that enables control in which the line pressure is switched stepwise between a low pressure state in a lower pressure range and a high pressure state in a higher pressure range; a plurality of hydraulic servos that engage and disengage friction engaging elements using engagement pressures that are based on the line pressure; and a high pressure state detecting device that detects that the line pressure regulating device is outputting the line pressure in the high pressure state.

20 Claims, 4 Drawing Sheets

HYDRAULIC CONTROL APPARATUS OF TRANSMISSION

INCORPORATION BY REFERENCE

The disclosure of Japanese Patent Application No. 2006-004245 filed on Jan. 11, 2006, including the specification, drawings, and abstract, is incorporated herein by reference in its entirety.

BACKGROUND

The present invention relates to a hydraulic control apparatus for a transmission.

There exists a hydraulic control apparatus for a transmission that is mounted in a vehicle or the like. The hydraulic control apparatus is structured such that a line pressure is switched between ranges in two states: (1) a state in which the line pressure is set to a low pressure range (below, simply referred to as a "low pressure state") and (2) a state in which the line pressure is set to a high pressure range (below, simply referred to as a "high pressure state") (refer to Japanese Patent Application Publication No. JP-A-2005-133856). This hydraulic control apparatus generally carries out shifting by hydraulically controlling the hydraulic servos of friction engaging elements (a first brake and a second brake) in a transmission that is used in what is termed a "dual-motor power-split hybrid vehicle" and that is interposed between a second motor that outputs a drive force and an output shaft to carry out low/high two stage shifting.

In this hydraulic control apparatus, the valve that regulates and outputs a line pressure urges a spool in one direction when a signal pressure is input from a solenoid valve, and oil pressure from the oil pumps substantially continues to be output from an output port, that is, the line pressure is set to a high pressure state. In addition, alternatively, when a signal pressure is not input from a solenoid valve, based on the urging force of a spring, the spool is controlled so as to attain a position that communicates an input port and a port that is connected to the drawing side of oil pumps (and the port that connects to the lubricating oil duct or the like), and a portion of the oil pressure from the oil pumps is output from the output port, that is, the line pressure is set to a low pressure state. When this line pressure is in the low pressure state, because the oil pump has reduced a portion of the oil pressure, it is possible to implement a reduction in the drive loss of the oil pump, and an improvement in the fuel economy for the vehicle can be attained.

SUMMARY

In the hydraulic control apparatus for the transmission as described above, during normal travel, the line pressure is controlled so as to attain a low pressure state. Electronic signals are sent to the solenoid valves described above, and control is carried out in which the line pressure is switched from a low pressure state to a high pressure state depending on the electronic signals. A switch occurs, for example, when the transmission transfers a large amount of torque, when shifting is carried out by switching engagement states of friction engaging elements, and when using the reaction force of a second motor, the engine is restarted from a stopped state by a first motor.

However, when the line pressure does not attain a high pressure state due to some sort of failure or when the line pressure is delayed in attaining a high pressure because, for example, the oil temperature becomes low and thus the viscosity becomes high, the line pressure will remain in the low pressure state and the engagement state of the friction engaging elements cannot be controlled normally. Specifically, there is a concern that, for example, the transferred drive force will become excessively large and cause slipping in the friction engaging elements. Alternatively, for example, the slipping or abrupt engagement of the friction engaging elements may occur while shifting and a large transmission shock will thereby occur. Alternatively, for example, while restarting the engine, the reaction force of a second motor is not transferred and the second motor will race. That is, in the case in which the line pressure remains in a low pressure state even though commands that regulate and control the line pressure so as to attain a high pressure state are generated, an operation of the transmission that is designed to be carried out when the line pressure is in the high pressure state may be caused to malfunction, which is not desirable.

The present invention thus provides, among other things, a hydraulic control apparatus for a transmission that prevents an operation of the transmission that is carried out when the line pressure is in a high pressure state from malfunctioning when the line pressure is in a low pressure state.

According to an exemplary aspect of the invention, a hydraulic control apparatus for a transmission includes a line pressure regulating device that enables control in which an oil pressure from an oil pump is regulated so as to attain a line pressure, and that enables control in which the line pressure is switched stepwise between a low pressure state in a lower pressure range and a high pressure state in a higher pressure range; a plurality of hydraulic servos that engage and disengage friction engaging elements using engagement pressures that are based on the line pressure; and a high pressure state detecting device that detects that the line pressure regulating device is outputting the line pressure in the high pressure state.

BRIEF DESCRIPTION OF THE DRAWINGS

Various exemplary embodiments will be described with reference to the drawings, wherein.

DETAILED DESCRIPTION OF EMBODIMENTS

First Embodiment

Figure 1:
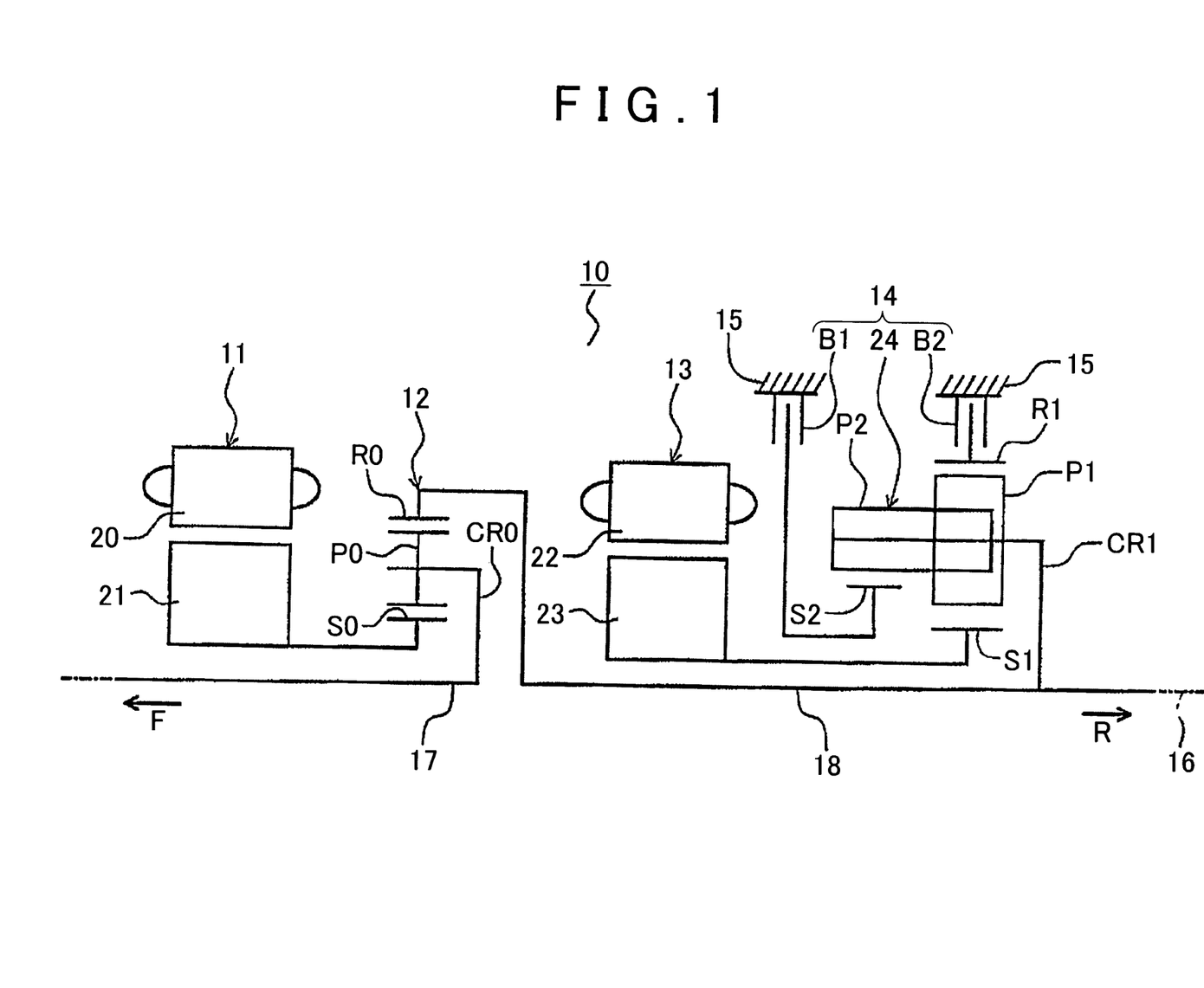
FIG. 1 is a skeleton drawing showing a schematic structure of a hybrid drive apparatus in which the hydraulic control apparatus for a transmission according to the present invention is applied.
Figure 2:
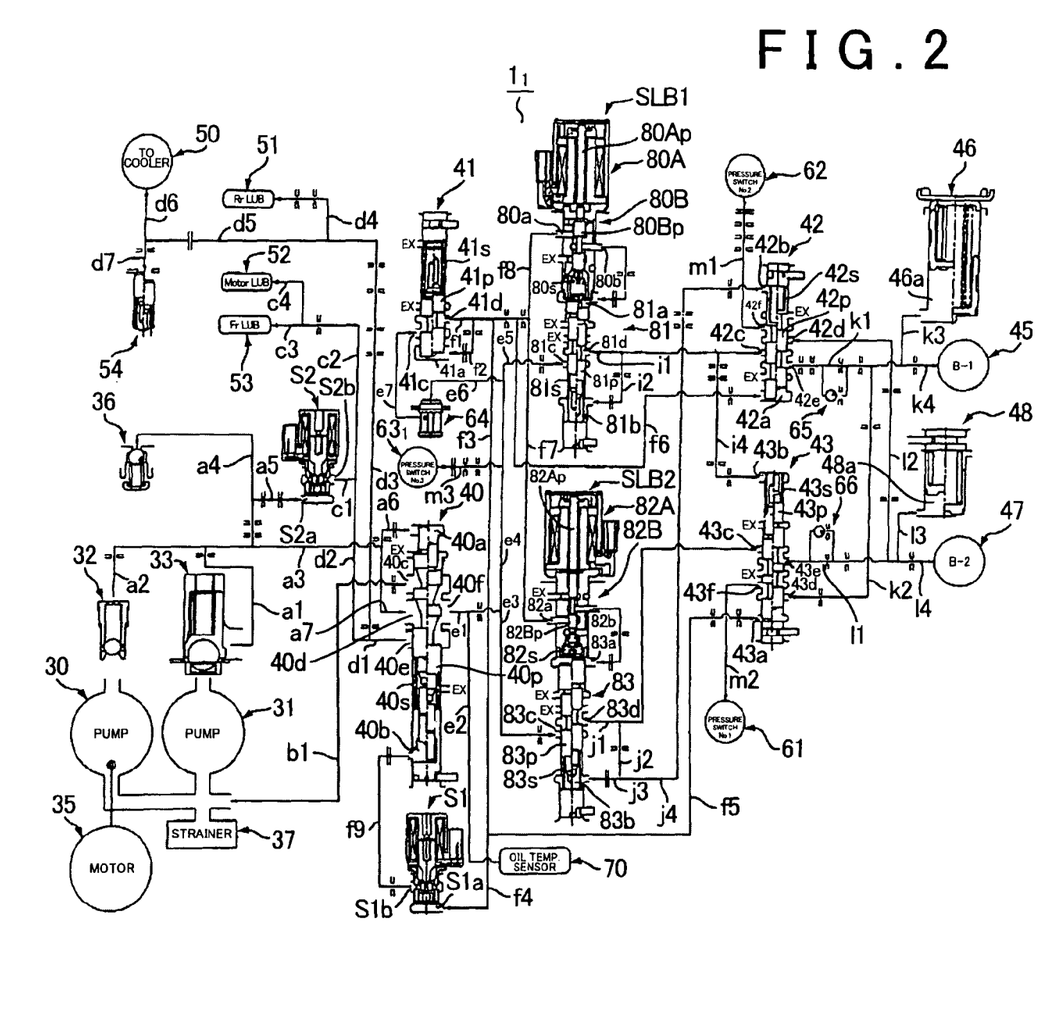
FIG. 2 is a drawing showing the hydraulic control apparatus for a transmission according to a first embodiment of the present invention.

Below, a first embodiment of the present invention will be explained with reference to FIG. 1 and FIG. 2. FIG. 1 is a skeleton drawing showing a schematic structure of a hybrid drive apparatus in which the hydraulic control apparatus for a transmission according to the present invention is applied, and FIG. 2 is a drawing showing a hydraulic control apparatus for a transmission according to a first embodiment of the present invention.

First, a hybrid drive apparatus to which the hydraulic control apparatus $1_1$ (refer to FIG. 2) for a transmission according to the present invention can be applied will be explained with reference to FIG. 1. Note that the hybrid drive apparatus 10 that is explained below is advantageously used in a FR (front engine/rear drive) type vehicle, and in FIG. 1, the direction of the arrow F denotes the front side (i.e., the engine side) of the vehicle, and the direction of the arrow R denotes the rear side (i.e., the differential apparatus side) of the vehicle.

As shown in FIG. 1, in the hybrid drive apparatus 10, in order from the front side to the rear side, a first electric motor (first motor) 11, a power distributing planetary gear 12, a second electric motor (second motor) 13, and a shift apparatus 14 are disposed. These are all accommodated inside a case 15, and at the same time, disposed around a shaft 16 (coaxial to an input shaft 17 and an output shaft 18). Note that the case 15 is formed integrally by bonding a plurality of partitioned cases front-to-end in the axial direction (the direction along the shaft 16). Further note that in the following explanation, the expression "axial direction" used alone denotes the direction along the shaft 16. This axial direction is aligned with the axial direction of the input shaft 17 and the output shaft 18.

The first electric motor 11 includes a stator 20 that is fixed to the case 15 and a rotor 21 that is freely rotationally supported on the inner diameter side of the stator 20 (note that in the following explanation, with respect to a position of the case 15 in the radial direction, the side near the shaft 16 is referred to as the "inner diameter side" and the side that is distant from the shaft 16 is referred to as the "outer diameter side"). The rotor 21 of the first electric motor 11 is connected to a sun gear S0 of the power distributing planetary gear 12, which will be described below. Such a first electric motor 11 generally carries out power generation based on the drive force that is output via the sun gear S0, drives the second electric motor 13 via an inverter (not illustrated), and charges an HV battery (hybrid drive battery; not illustrated).

The power distributing planetary gear 12 is structured by a single pinion planetary gear that is disposed coaxially to the input shaft 17. The power distributing planetary gear 12 includes a carrier (rotating element) CR0 that supports a plurality of pinions P0, the sun gear (rotating element) S0 that meshes with these pinions P0, and a ring gear (rotating element) R0 that meshes with the pinions P0. In the power distributing planetary gear 12, the carrier CR0 is linked to the input shaft 17, the sun gear S0 is linked to the rotor 21 of the first electric motor 11, and furthermore, the ring gear R0 is linked to the output shaft 18. Such a power distributing planetary gear 12 divides the drive that has been input to the carrier CR0 via the input shaft 17 into the first electric motor 11 side via the sun gear S0 and the output shaft 18 side via the ring gear R0 based on the rotation control of the first electric motor 11. Note that the power that is transferred to the first electric motor 11 is supplied for power generation, while the power that is transferred to the output shaft 18 is supplied for driving the automobile.

The second electric motor 13 includes a stator 22 that is fixed to the case 15 and a rotor 23 that is freely rotationally supported on the inner diameter side of the stator 22. The rotor 23 of the second electric motor 13 is linked to the sun gear S1 of the shift apparatus 14, which is described below. Similar to the first electric motor 11 described above, the second electric motor 13 is connected to an HV battery via an inverter. However, the general function is different from the first electric motor. Specifically, unlike the first electric motor 11 that is generally used for power generation, the second electric motor 13 generally functions as a drive motor to boost the drive (drive power) of the vehicle. However, during braking and the like, the second electric motor 13 functions as a generator to convert the vehicle kinetic energy into electrical energy.

The shift apparatus (transmission) 14 has what is termed a Ravigneaux-type planetary gear unit 24 that includes one double pinion planetary gear and a single planetary gear that shares one pinion of the double pinion planetary gear, and furthermore, includes a first brake B1 (a friction engaging element) and a second brake B2 (a friction engaging element).

The planetary gear unit 24 includes two sun gears S1 and S2, a carrier CR1 that supports the pinion P1 and the pinion P2, which is the shared long pinion, and the ring gear R1. The pinion P1 meshes with the sun gear S1 and the ring gear R1, and the pinion P2 meshes with the sun gear S2 and the pinion P1. In the planetary gear unit 24, the ring gear R1 thereof is connected to the second brake B2 and the sun gear S2 thereof is connected to the first brake B1. In the overall shift apparatus 14, the sun gear S1, which functions as the input member, is linked to the rotor 23 of the second electric motor 13 described above, and the carrier CR1, which functions as the output member, is linked to the output shaft 18.

The shift apparatus 14 engages one among the first brake B1 and the second brake B2 while releasing the other, and alternatively, releases the later while engaging the former, and can thereby switch between two deceleration speeds that have two differing reduction gear ratios. Specifically, the shift apparatus 14 changes the size of the drive force that is input from the second electric motor 13 described above via the sun gear S1, and transfers the drive force to the output shaft 18 via the carrier CR1. In the present embodiment, when the first brake B1 is engaged and the second brake B2 is released, the high (Hi) gear speed is established, and alternatively, the low (Lo) gear speed is established by engaging the second brake B2 and releasing the first brake B1. When shifting from the low gear speed to the high gear speed or from the high gear speed to the low gear speed, the shifting is carried out by switching the engagement states of the first brake B1 and the second brake B2 (the friction engaging elements).

In the hybrid drive apparatus 10 described above, the drive force that is input from the engine to the input shaft 17 is divided into the first electric motor 11 and the output shaft 18 by the power distributing planetary gear 12. In addition, the drive force from the second electric motor 13 is transferred to the output shaft 18 via the shift apparatus 14. Specifically, the drive force from the engine and the drive force of the second electric motor 13 are combined and output to the output shaft 18.

In addition, when traveling after stopping the engine, which is referred to as EV travel, generally, the drive force form the second electric motor 13 is transferred and output to the output shaft 18 via the shift apparatus 14. As this time, because the engine has stopped, that is, the rotation of the input shaft 17 and the carrier CR0 has stopped, although the rotation of the output shaft 18 and the ring gear R0 is transferred to the sun gear S0 via the carrier CR0, whose rotation has stopped, the first electric motor 11 races.

In addition, when the engine restarts from a travel state in which the engine has been stopped, as described above, the first brake B1 and the second brake B2 described above remain engaged, the drive force of the second electric motor 13 is imparted as a reaction force to the ring gear R0 via the shift apparatus 14 and the output shaft 18, the sun gear S0 is rotated by the first electric motor 11, the rotation of the input shaft 17 via the carrier CR0 is thereby increased, the engine speed of the engine that is connected to the input shaft 17 is increased, and the engine is restarted.

Next, the hydraulic control apparatus $1_1$ for a transmission according to a first embodiment of the present invention will be explained with reference to FIG. 2. Note that in the present specification, the expression "normally open" pertaining to the various types of solenoid valve denotes that, when non-energized, the input port and the output port communicate and the input of oil pressure substantially continues to be output from the output port, and conversely, "normally closed" denotes that, when non-energized, the input port and the output port are interrupted and the input oil pressure is not output from the output port.

As shown in FIG. 2, the hydraulic control apparatus $1_1$ for a transmission is provided with a mechanical oil pump 31 that is linked to and driven by the rotation of the engine and an electrical oil pump 30 that is driven by the electric motor 35 irrespective of the drive state of the engine, and oil pressure is generated by oil being drawn from an oil pan (not illustrated) via a strainer 37 by the mechanical oil pump 31 and the electrical oil pump 30. In addition, check valves 33 and 32 are respectively provided and connected to the mechanical oil pump 31 and the electrical oil pump 30, a generated oil pressure is supplied from the oil ducts a1 and a2 that are connected to the check valves 33 and 32, and thereby, when either one of the oil pumps is stopped, the oil is prevented from back flowing by these check valves 33 and 32.

The oil pressure that is generated by the mechanical oil pump 31 and the electrical oil pump 30 is supplied to the oil ducts a3, a4, a5, a6, and a7 via the oil ducts a1 and a2. The oil pressure that is supplied to the oil duct a4 is supplied to the check valve 36, and when the generated oil pressure is too high, the oil pressure is regulated by draining (discharging) the excess oil pressure. The oil pressure that is supplied to the oil duct a5 is supplied to the input port S2a of the solenoid valve S2 (normally open), and the oil pressure is supplied substantially continuously from the output port S2b to the oil ducts c1, c2, c3, and c4 when the solenoid valve S2 is non-energized. The oil ducts c3 and c4 are respectively connected to the lubricating oil duct 53 of the front end of the transmission and the lubricating oil duct 52 of the motor, and the lubricating oil is supplied to the lubricating oil duct 53 of the front end of the transmission and the lubricating oil duct 52 of the motor based on the oil pressure that has been supplied to the oil ducts c3 and c4. The oil pressure that is supplied to the oil ducts a6 and a7 is supplied to the oil chamber 40a of the pressure regulating valve 40 and the input port 40d, which will be described below.

The pressure regulating valve (line pressure regulating device, regulating valve) 40 is provided with a spool 40p and a spring 40s that urges the spool 40p upward, and is also provided with an oil chamber 40a that is disposed above the spool 40p, an oil chamber 40b that is disposed below the spool 40p, an input port 40d, an output port 40c, an output port 40e, and an output port 40f. When the spool 40p is in the state shown in the left half portion (below, referred to as the "left half position"), the pressure regulating valve 40 communicates only with the input port 40d and the output port 40f (that is, the input port 40d and the output port 40c are interrupted), and the oil pressure that is supplied to the oil duct a7 continues to be output to the oil duct e1. Thereby, the line pressure $P_L$ attains a pressure state $P_L$HI in which the oil pressure is high relative to the low pressure state to be described below.

In contrast, when the spool 40p is in the state shown on the right half position (below, referred to as the "right half position"), input port 40d is connected to the three output ports; output port 40c, output port 40e, and output port 40f, and the oil pressure that is supplied to the oil duct a7 is divided into 40f, 40c, and 40e. Thereby, the line pressure $P_L$ attains a low pressure state $P_L$LO, in which the oil pressure is low relative to the high pressure state $P_L$HI described above. The oil pressure that is output from the output port 40c returns to the mechanical oil pump 31 and the electrical oil pump 30 via the oil duct b1 and serves as the primary pressure for the mechanical oil pump 31 and the electrical oil pump 30, and as a result, the mechanical oil pump 31 and the electrical oil pump 30 lower the necessary drive force, it is possible to prevent wasteful energy consumption, and it is possible to contribute to an improvement in the fuel economy of a vehicle that is provided with the hydraulic control apparatus $1_1$ for a transmission.

In addition, the oil pressure that is output from the output port 40e is supplied to the oil ducts d1, d2, d3, d4, d5, d6, and d7. The oil pressure that is supplied to the oil duct d2 merges with the oil pressure that is output from the output port S2b of the solenoid valve S2 described above to the oil duct c1, and is supplied to the lubricating oil duct 53 of the front end of the speed change mechanism and the lubricating oil duct 52 of the motor described above. Note that in the case in which the lubricating oil in the lubricating oil duct 53 at the front end of the speed change mechanism and the lubricating oil duct 52 of the motor is insufficient, the output port S2b is interrupted by electrically controlling the solenoid valve S2, and the necessary amount of lubricating oil is ensured.

The oil pressures that are supplied to the oil ducts d1, d3, d4, d5, d6, and d7 are respectively supplied to the lubricating oil duct 51 at the back end of the speed change mechanism, the oil cooler 50, and the check valve 54, supplied to the lubricating oil duct 51 of the back end of the speed change mechanism as lubricating oil, and at the same time, is supplied to the oil cooler 50 that cools the oil, and when the oil pressure is too high, the oil pressure is regulated by being drained from the check valve 54.

In contrast, the line pressure $P_L$ that is output from the output port 40f of the pressure regulating valve 40 to the oil duct e1 is supplied to the oil duct e7 via the oil ducts e2, e3, e4, e5, and e6 and the oil strainer 64. Among these, the line pressure $P_L$ that is supplied to the oil ducts e3 and e5 is supplied to the input port 81c of a first regulating valve 81 and the input port 83c of a second regulating valve 83, which will be described in detail below. The line pressure $P_L$ that is supplied to the oil duct e2 is supplied to the temperature sensor 70, and the temperature thereof is detected. In addition, the line pressure $P_L$ that is supplied to the oil duct e7 via the oil duct e6 and the oil strainer 64 is supplied to the input port 41c of the modulator valve 41.

In addition, a third hydraulic switch (high pressure state detecting device) $63_1$, which is an essential component of the present invention, is connected to the oil duct e4 via the oil duct m3, and the third hydraulic switch $63_1$ directly communicates with the output port 40f of the pressure regulating valve 40 (no other valves or the like are interposed therebetween). A threshold value is set such that the third hydraulic switch $63_1$ is turned ON when the line pressure $P_L$HI in a high pressure state is output from the output port 40f of the pressure regulating valve 40, and is turned OFF when a line pressure $P_L$LO in a low pressure state is output. The turning ON/OFF of the third hydraulic switch $63_1$ is output as a signal to the control unit of the hybrid drive apparatus 10 (not illustrated), and functioning as the control for the control unit, is used during the operation of the shift apparatus 14, which will be explained in detail below.

In contrast, the modulator valve 41 is provided with a spool 41p and a spring 41s that urges the spool 41p downward, and in addition, is provided with a feedback oil chamber 41a that is disposed below the spool 41p, an input port 41c, an output port 41d, and drain ports EX that are disposed above the input port 41c. When the modulator valve 41 is disposed in the right half position, as described above, while the line pressure $P_L$ is supplied to the input port 41c, the line pressure $P_L$ substantially continues to be output from the output port 41d and is supplied to the oil duct f1. The line pressure $P_L$ that is supplied to the oil duct f1 is output to the feedback oil chamber 41a via the oil duct f2. When the line pressure $P_L$ that is input to the oil chamber 41a attains a level that is higher than the urging force of the spring 41s, the spool 41p of the modulator valve 41 is moved to the right half position, and the communication state in the opening between the input port 41c and the output port 41d is half-opened, and the output oil pressure is thereby reduced. Furthermore, when the oil pressure of the feedback oil chamber 41a is high, the output port 41c and the drain ports EX are communicated and the output oil pressure is reduced, and thereby the line pressure $P_L$ input thereby is output from the output port 41d as a modulator pressure $P_{MOD}$ that has been regulated so as to be reduced.

The modulator pressure $P_{MOD}$ is supplied to each of the ducts f1, f2, f3, f4, f5, f6, f7, and f8. Among these ducts, the modulator pressure $P_{MOD}$ that is supplied to the oil ducts f8 and f7 is supplied respectively to an input port 80a of a solenoid valve SLB1 and an input port 82a of the linear solenoid valve SLB2, which will be described in detail below. In addition, the modulator pressure $P_{MOD}$ that is supplied to the oil ducts f6 and f5 is supplied to the oil chamber 42a of the B1 apply control valve 42 and the oil chamber 43a of the B2 apply control valve 43, which will be described in detail below.

In addition, the modulator pressure $P_{MOD}$ that is supplied to the oil duct f4 via the oil duct f3 is supplied to the input port S1a of solenoid valve (line pressure regulating device) S1 (normally open), and is then supplied as a signal pressure $P_{S1}$ from the output port S1b to the oil chamber 40b of the pressure regulating valve 40 described above via the oil duct f9. Thereby, in the spool 40p of the pressure regulating valve 40, the urging force of the spring 40s and the modulator pressure $P_{MOD}$ supplied to the oil chamber 40b are coupled, and thereby the oil pressure that is supplied to the oil chamber 40a becomes high. Thereby, the line pressure $P_L$ is controlled so as to attain a high pressure state $P_L HI$, as described above. In addition, when the solenoid valve S1 is electronically controlled, the output port S1b is interrupted, and the signal pressure $P_{S1}$ is not output, the oil pressure that is supplied to the oil chamber 40a becomes low, and thereby, the line pressure $P_L$ is controlled so as to attain a low pressure state $P_L LO$, as described above.

There are several cases in which the line pressure $P_L$ is controlled so as to attain a high pressure state $P_L HI$, such as, for example, when the shift control is carried out by switching the engagement states of the first brake B1 and the second brake B2, when a travel state in which the torque that is input to the transmission during acceleration and the like is large, and when the drive force of the second electric motor 13 works as a reaction force and the engine is restarted by the first electric motor 11. In particular, when the output of the second electric motor is low, when the first brake B1 and the second brake B2 are engaged and the vehicle is traveling, electronic control is carried out such that the solenoid valve S1 is interrupted, and the line pressure $P_L$ is controlled so as to attain a low pressure state $P_L LO$, which means that, except when shifting, the wasteful consumption of energy can be prevented.

In contrast, the normally open linear solenoid valve SLB1 is structured by a linear drive portion 80A and a regulating valve portion 80B. The linear drive portion 80A is structured by a spool 80Ap that is driven downward depending on a supplied (conducted) current, and the other regulating valve 80B is provided with a spool 80Bp and a spring 80s that urges the spool 80Bp downward, and in addition, is also provided with an input port 80a, an output port 80b, and drain ports EX that are disposed below the input port 80a.

Specifically, the linear solenoid valve SLB1 is structured such that the spool 80Ap and the spool 80Bp are driven upward depending on a supplied current, and when non-energized, the spool 80Ap and the spool 80Bp are driven upward by the spring 80s. Thereby, during a non-energized time interval, in which a current is not supplied to the linear drive portion 80A of the linear solenoid valve SLB1, the spool 80B is controlled so as to attain an upward position, and the opening between the input port 80a and the output port 80b is set to the most open communication state, and the SLB1 pressure $P_{SLB1}$ is output at the highest pressure based on the modulator pressure $P_{MOD}$ that is supplied to the input port 80a.

In addition, when a current is gradually supplied to the linear drive portion 80A of the linear solenoid valve SLB1, the spool 80Ap and the spool 80Bp are controlled so as to be gradually driven downward. The opening between the input port 80a and the output port 80b is gradually interrupted and closed, the output port 80b and the drain ports EX are opened, and the output SLB1 pressure $P_{SLB1}$ is gradually decreased to a low pressure. Finally, when the maximum current is supplied to the linear drive portion 80A, the linear solenoid valve SLB1 outputs substantially no or outputs very little SLB1 pressure $P_{SLB1}$.

The first regulating valve 81 is disposed so as to be connected directly below the linear solenoid valve SLB1 described above, and it is provided with a spool 81p, a spring 81s that urges the spool 81p upward, an oil chamber 81a that is disposed above the spool 81p and inputs the SLB1 pressure $P_{SLB1}$, a feedback chamber 81b that is disposed below the spool 81p, an input port 81c, an output port 81d, and drain ports EX that are disposed above the input port 81c. Note that it is not particularly necessary to dispose the regulating valve 81 by connecting it directly below the linear solenoid valve SLB1, and it may be disposed separately at another position.

When the regulating valve 81 inputs the SLB1 pressure $P_{SLB1}$ at the maximum pressure from the normally open linear solenoid valve SLB1 to the oil chamber 81a, the spool 81p is set in the right half position due to being overcome by the urging force of the spring 81s, the opening between the input port 81c and the output port 81d attains the most open communicating state, and the line pressure $P_L$ that is input to the input port 81c is output to the oil duct i1 from the output port 81d as the maximum B1 supply pressure (engagement pressure) $P_{B1}$.

Then, when a current is gradually supplied to the linear solenoid valve SLB1 described above and the SLB1 pressure $P_{SLB1}$ that is input to the oil chamber 81a is regulated so as to gradually attain a low pressure, the first regulating valve 81 is set in a state in which the spool 81p is controlled so as to gradually move from the right half position to the left half position due to the urging force of the spring 81s to gradually interrupt and close the opening between the input port 81c and the output port 81d. The B1 supply pressure $P_{B1}$ is regulated so as to attain a low pressure, and finally the opening between the input port 81c and the output port 81d is interrupted, the output port 81d and the drain ports EX are communicated, and the B1 supply pressure $P_{B1}$ is drained.

Note that a portion of the B1 supply pressure $P_{B1}$ that is output to the oil duct i1 is supplied to the feedback chamber 81b via the oil duct i2. Thereby, for example, when the B1 supply pressure $P_{B1}$ is suddenly output at a high pressure, the spool 81p is forced upwards and the B1 supply pressure $P_{B1}$ is reduced, and when the B1 supply pressure $P_{B1}$ pulsates, the B1 supply pressure $P_{B1}$ is stabilized.

In contrast, the normally closed linear solenoid valve SLB2 is structured by a linear drive portion 82A and a regulating valve portion 82B. The linear drive portion 82A includes a spool 82Ap that is driven downward depending on a supplied (conducted) current, and the regulating valve 82B is provided with a spool 82Bp and a spring 82s that urges the spool 82Bp upward, and is also provided with an input port 82a, an output port 82b, and a drain port EX that is disposed above the input port 82a.

Specifically, the linear solenoid valve SLB2 is structured such that the spool 82Ap and the spool 82Bp are driven downward depending on a supplied current, and when non-energized, the spool 82Ap and the spool 82Bp are driven upward by the spring 82s. Thereby, while non-energized, that is, when a current is not being supplied to the linear drive portion 82A of the linear solenoid valve SLB2, the spool 82Bp is controlled so as to attain an upward position, the opening between the input port 82a and the output port 82b is interrupted, and at the same time, the output port 82b and the drain port EX are opened, and the SLB2 pressure $P_{SLB2}$ is not output.

In addition, when a current is gradually supplied to the linear drive portion 82A of the linear solenoid valve SLB2, the spool 82Ap and the spool 82Bp are controlled so as to be gradually driven downward, the opening between the input port 82a and the output port 82b is gradually communicated and opened, the output port 82b and the drain port EX are gradually closed, and the output SLB2 pressure $P_{SLB2}$ is gradually increased to a high pressure. Finally, when the maximum current is supplied to the linear drive portion 82A, the linear solenoid valve SLB2 outputs the SLB2 pressure $P_{SLB2}$ at the maximum pressure.

The second regulating valve 83 is disposed so as to be connected directly below the linear solenoid valve SLB2 described above, and it is provided with a spool 83p, a spring 83s that urges the spool 83p upward, an oil chamber 83a that is disposed above the spool 83p and inputs the SLB2 pressure $P_{SLB2}$ described above, a feedback oil chamber 83b that is disposed below the spool 83p, an input port 83c, an output port 83d, and drain ports EX that are disposed above the input port 83c. Note that it is not particularly necessary to dispose the second regulating valve 83 so as to be connected directly below the linear solenoid valve SLB2, and it may be disposed separately at another position.

In the second regulating valve 83, when the SLB2 pressure $P_{SLB2}$ due to the normally closed linear solenoid valve SLB2 described above is at 0, that is, oil pressure is not being input to the oil chamber 83a, the spool 83p is set to the right half position due to the urging force of the spring 83s, the opening between the input port 83c and the output port 83d is interrupted and the output port 83d and the drain port EX are communicated, and the B2 supply pressure (engagement pressure) $P_{B2}$ is drained.

In addition, when a current is gradually supplied to the linear solenoid valve SLB2 described above and the SLB2 pressure $P_{SLB2}$ that is input to the oil chamber 82a is regulated so as to attain a high pressure gradually, in the second regulating valve 83, the spool 83p is controlled so as to move gradually from the right half position to the left half position due to being overcome by the urging force of the spring 83s to gradually communicate and open the opening between the input port 83c and the output port 83d, the output port 83d and the drain ports EX are gradually interrupted, and the B2 supply pressure $P_{B2}$ is regulated so as to attain a high pressure. Finally, the opening between the input port 83c and the output port 83d is communicated, the output port 83d and the drain port EX is interrupted, and the line pressure $P_L$ that is input to the input port 83c is output to the oil duct j1 from the output port 83d as the B2 supply pressure $P_{B2}$ at a maximum pressure.

Note that a portion of the B2 supply pressure $P_{B2}$ that is output to the oil duct j1 is supplied to the feedback chamber 83b via the oil ducts j2 and j3. Thereby, for example, when the B2 supply pressure $P_{B2}$ is suddenly output at a high pressure, the spool 83p is forced upwards and the B2 supply pressure $P_{B2}$ is thereby reduced, and when the B2 supply pressure $P_{B2}$ pulsates, the B2 supply pressure $P_{B2}$ is thereby stabilized.

The B1 apply control valve 42 is provided with a spool 42p, a spring 42s that urges the spool 42p downward, an oil chamber 42a that is disposed below the spool 42p and inputs the modulator pressure $P_{MOD}$ described above, an oil chamber 42b that is disposed above the spool 42p and inputs the B2 supply pressure $P_{B2}$, an input port 42c that inputs the B1 supply pressure $P_{B1}$ described above, an output port 42e, a drain port EX that is disposed below the input port 42c, an input port 42d that will be explained in detail below, and an output port 42f.

In the B1 apply control valve 42, when the modulator pressure $P_{MOD}$ is input to the oil chamber 42a described above and the B2 supply pressure $P_{B2}$ is output from the linear solenoid valve SLB2 described above, the spool 42p is moved to the right half position due to being overcome by the urging force of the spring 42s, and the input port 42c and the output port 42e are communicated. The B1 supply pressure $P_{B1}$ that is output from the first regulating valve 81 continues to be supplied to the oil chambers k1, k2, k3, and k4, that is, the B1 supply pressure $P_{B1}$ that is output from the first regulating valve 81 continues to be supplied to the hydraulic servo 45 of the first brake B1, and the first brake B1 is thereby engaged.

In addition, a portion of the B1 supply pressure $P_{B1}$ is supplied to the input port 43d of the B2 apply control valve 43, which will be described below, via the oil duct k2, and is then supplied to the input port 46a of the accumulator 46 via the oil duct k3. Note that the accumulator 46 prevents the pulsating of the B1 supply pressure $P_{B1}$ that is supplied to and discharged from the hydraulic servo 45, and absorbs surge pressure (rapidly fluctuating pressure). In addition, a check ball 65 is disposed on the oil duct k1, and thereby when the B1 supply pressure $P_{B1}$ is supplied to the hydraulic servo 45, the oil pressure is supplied relatively slowly, and when the B1 supply pressure $P_{B1}$ is discharged from the hydraulic servo 45, the oil pressure is discharged relatively rapidly.

When the linear solenoid valve SLB2 is controlled and the B2 supply pressure $P_{B2}$ is output from the output port 83d of the second regulating valve 83 as described above, the B1 apply control valve 42 inputs the B2 supply pressure $P_{B2}$ to the oil chamber 42b via the oil duct j4, and the spool 42p is switched to the left half position due to being overcome by the modulator pressure $P_{MOD}$ of the oil chamber 42a that is coupled with the urging force of the spring 42s and the B2 supply pressure $P_{B2}$ of the oil chamber 42b.

Thereby, the opening between the input port 42c and the output port 42e is interrupted, the output port 42e and the drain port EX are communicated, the B1 supply pressure $P_{B1}$ of the hydraulic servo 45 is discharged, and the first brake B1 is released. In addition, at this time, when the B2 supply pressure $P_{B2}$ is output from the B2 apply control valve 43 described below, because the B2 supply pressure $P_{B2}$ is input to the input port 42d via the oil duct l2 and the input port 42d and the output port 42f are thereby communicated, while the B2 supply pressure $P_{B2}$ is supplied to the second hydraulic switch (engagement hydraulic switch) 62 via the oil duct m1, and in particular, while the line pressure is in a high pressure state $P_L$HI, it is detected that the B2 supply pressure $P_{B2}$ is supplied from the second hydraulic switch 62 to the hydraulic servo 47 of the second brake B2.

The B2 apply control valve 43 is provided with a spool 43p, a spring 43s that urges the spool 43p downward, an oil chamber 43a that is disposed below the spool 43p and inputs the modulator pressure $P_{MOD}$, an oil chamber 43b that is disposed above the spool 43p and inputs the B1 supply $P_{B1}$, an input port 43c that inputs the B2 supply pressure $P_{B2}$ described above, an output port 43e, a drain port EX that is disposed below the input port 43c, an input port 43d that inputs the B1 supply pressure $P_{B1}$ from the B1 apply control valve 42, and an input port 43f.

In the B2 apply control valve 43, when the modulator pressure $P_{MOD}$ is input to the oil chamber 43c described above, and the B1 supply pressure $P_{B1}$ is output from the linear solenoid valve SLB1 described above, the spool 43p is moved to the right half position due to being overcome by the urging force of the spring 43s, and the input port 43c and the output port 43e are thereby communicated. The B2 supply pressure $P_{B2}$ that is output from the second regulating valve 83 continues to be supplied to the oil chambers 11, 12, 13, and 14, that is, the B2 supply pressure $P_{B2}$ that is output from the second regulating valve 83 continues to be supplied to the (second) hydraulic servo 47 of the second brake B2, and the second brake B2 is thereby engaged.

In addition, a portion of the B2 supply pressure $P_{B2}$ is supplied to the input port 42d of the B1 apply control valve 42, via the oil duct 12, and is then supplied to the input port 48a of the accumulator 48 via the oil duct 13. Note that the accumulator 48 prevents the pulsating of the B2 supply pressure $P_{B2}$ that is supplied to and discharged from the hydraulic servo 47 and absorbs surge pressure (rapidly fluctuating pressure). In addition, a check ball 66 is disposed on the oil duct 11, and when the B2 supply pressure $P_{B2}$ is supplied to the hydraulic servo 47, the oil pressure is supplied relatively slowly, and when the B2 supply pressure $P_{B2}$ is discharged from the hydraulic servo 47, the oil pressure is discharged relatively rapidly.

When the linear solenoid valve SLB1 is controlled and the B1 supply pressure $P_{B1}$ is output from the output port 81d of the first regulating valve 81 as described above, the B2 apply control valve 43 inputs the B1 supply pressure $P_{B1}$ to the oil chamber 43b via the oil duct i4, and the spool 43p is switched to the left half position due to being overcome by the modulator pressure $P_{MOD}$ of the oil chamber 43a that is coupled with the urging force of the spring 43s and the B1 supply pressure $P_{B1}$ of the oil chamber 43b.

Thereby, the opening between the input port 43c and the output port 43e is interrupted, the output port 43e and the drain port EX are communicated, the B2 supply pressure $P_{B2}$ of the hydraulic servo 47 is discharged, and the second brake B2 is released. In addition, at this time, when the B1 supply pressure $P_{B1}$ is output from the B1 apply control valve 42, because the B1 supply pressure $P_{B1}$ is input to the input port 43d via the oil duct k2 and the input port 43d and the output port 43f are thereby communicated, when the B1 supply pressure $P_{B1}$ is supplied to the first hydraulic switch (engagement hydraulic switch) 61 via the oil duct m2, and in particular when the line pressure is in a high pressure state $P_L$HI, it is detected that the B1 supply pressure $P_{B1}$ is supplied to the hydraulic servo 45 of the first brake B1 by the first hydraulic switch 61.

According to the hydraulic control apparatus $1_1$ for a transmission according to the present invention as described above, because a third hydraulic switch $63_1$ is provided that detects that the pressure regulating valve 40 is outputting a line pressure $P_L$HI, which is in a high pressure state, it is possible to detect whether the line pressure is regulated and controlled by the pressure regulating valve 40 and the solenoid valve S1 so as to be in a high pressure state $P_L$HI. Thereby, based, for example, on the control of the control portion of the hybrid drive apparatus 10, it is possible to prevent an operation of a transmission that is designed to be carried out when the line pressure is in a high pressure state $P_L$HI from malfunctioning when the line pressure continues to be in a low pressure state $P_L$LO.

In addition, in particular, because the switching the engagement states of the first brake B1 and the second brake B2 is started after the third hydraulic switch $63_1$ has detected the output of the line pressure $P_L$HI, which is in a high pressure state, the switching of the engagement states of the first brake B1 and the second brake B2 is carried out while the line pressure is in the low pressure state $P_L$LO, and it is thereby possible to prevent slipping or abrupt engagement from occurring, and it is possible to prevent transmission shock from occurring.

Furthermore, because the restarting of the engine is carried out after the third hydraulic switch $63_1$ has detected the output of the line pressure $P_L$HI, which is in a high pressure state, it is possible to prevent the second motor 13 from racing when, for example, the restarting of the engine is carried out while the line pressure is in a low pressure state $P_L$LO and the reaction force of the second motor is not transferred.

In addition, with respect to the changing of the line pressure between the low pressure state and the high pressure state, it is possible to set the line pressure to the low pressure state $P_L$LO by not outputting a signal pressure $P_{S1}$ of the solenoid valve S1, and it is possible to set the line pressure to the high pressure state $P_L$HI by outputting the signal pressure $P_{S1}$ of the solenoid valve S1.

Furthermore, because the third hydraulic switch $63_1$ is directly connected to the output port 40f of the pressure regulating valve 40, there is no influence due, for example, to the sticking of other valves, and it is possible to detect that the line pressure is in a high pressure state $P_L$HI.

In addition, because a first hydraulic switch 61 that communicates with the hydraulic servo 45 of the first brake B1 and the second hydraulic switch 62 that communicates with the hydraulic server 47 of the second brake B2 are provided, it is possible to determine correctly the failure state based on the ON/OFF state of the third hydraulic switch $63_1$ and the first and second hydraulic switches 61 and 62. Specifically, irrespective of whether the third hydraulic switch $63_1$ is ON and a line pressure $P_L$HI in a high pressure state is detected, in the case in which both the first hydraulic switch 61 and the second hydraulic switch 62 are both OFF, it is possible to determine the state to be a failure state, and alternatively, when the third hydraulic switch $63_1$ is OFF and the line pressure is in the low pressure state $P_L$LO, even if the first hydraulic switch 61 and the second hydraulic switch 62 are both OFF, it is possible to determine that the state is not a failure state (damage to a hydraulic switch). Note that in the shift apparatus 14 during normal operation in the present embodiment, because the first brake B1 and the second brake B2 cannot be simultaneously engaged, even when the first hydraulic switch 61 and the second hydraulic switch 62 are both ON, it is possible to determine that the state is a failure state.

Second Embodiment

Figure 3:
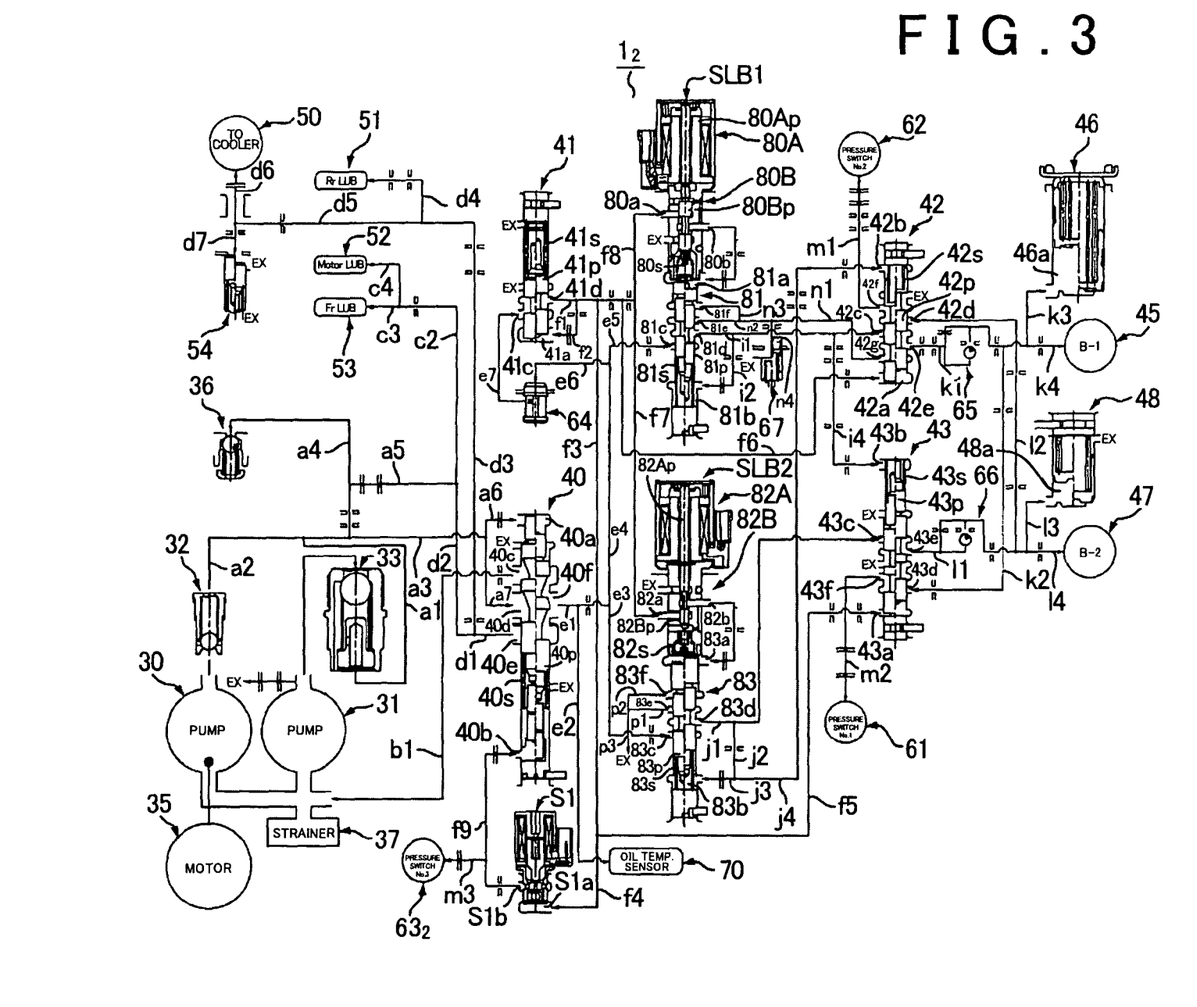
FIG. 3 is a drawing showing the hydraulic control apparatus for a transmission according to a second embodiment of the present invention.
Figure 4:
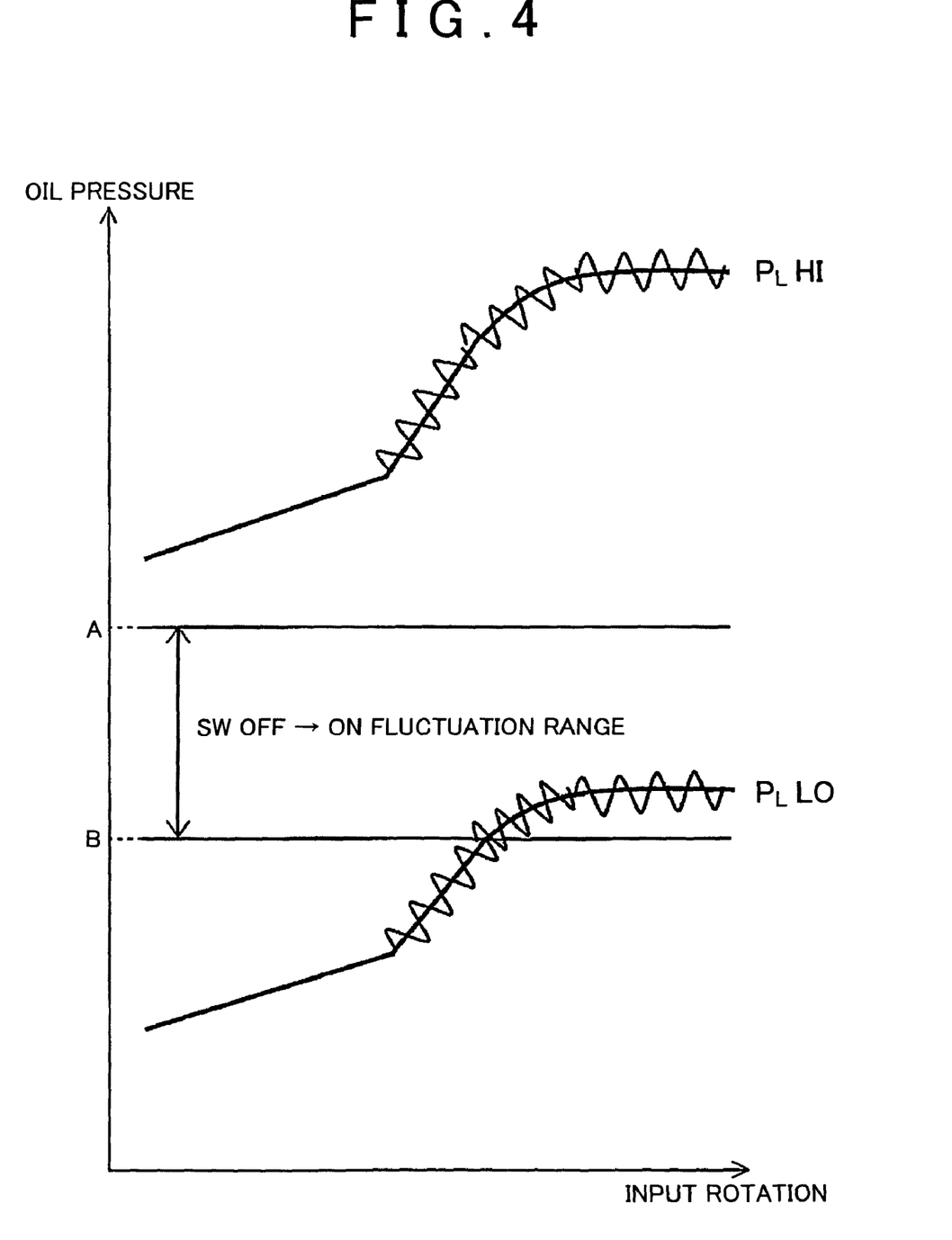
FIG. 4 is an explanatory drawing showing the relationship between the line pressure in a high pressure state and a low pressure state based on the input rotation and the detection error range of the hydraulic switch.

Next, a second embodiment, in which a portion of the first embodiment as described above has been modified, will be explained with reference to FIG. 3 and FIG. 4. FIG. 3 is a drawing showing the hydraulic control apparatus for a transmission according to the second embodiment of the present invention, and FIG. 4 is an explanatory drawing showing the relationship between the line pressure in a high pressure state and a low pressure state based on the input rotation and the detected error range of the hydraulic switch. Note that in the second embodiment, except for a part of the modified portion, identical reference numbers denote portions that are identical to those in the first embodiment described above, and the explanation thereof is omitted.

The hydraulic control apparatus $1_2$ for a transmission according to the second embodiment is one in which, in contrast to the hydraulic control apparatus $1_1$ for a transmission according to the first embodiment, modifies the disposition of the third hydraulic switch. The third hydraulic switch $63_2$ is disposed via the oil duct m3 on the oil duct f9, which communicates the output port S1b of the solenoid valve S1 and the oil chamber 40b of the pressure regulating valve 40.

Note that in the other portions thereof, the hydraulic control apparatus $1_2$ for a transmission is structured such that the solenoid valve S2 is eliminated, the oil duct a5 is connected directly to the oil duct c2, and the lubricating oil is constantly supplied to the lubricating oil duct 53 of the front end of the transmission and the lubricating oil duct 52 of the motor by a mechanical oil pump 31 or an electrical oil pump 30.

In addition, the port 42g of the B1 apply control valve 42 is structured so as to be connected to the ports 81e and 81f of the first regulating valve 81 via the oil ducts n1, n2, and n3, and at the same time, is connected to the check valve 67 via the oil duct n4. Thus, accompanying the drive of the linear solenoid valve SLB2, the line pressure $P_L$ is input from the second regulating valve 83 to the oil chamber 42b of the B1 apply control valve 42, and when the B1 apply control valve 42 is controlled so as to move to the left half position, the port 42e and the port 42g are communicated, and the oil pressure of the hydraulic servo 45 of the first brake B1 is input to the port 81e and the port 81f of the first regulating valve 81, and the unnecessary pressure is drained from the check valve 67. Thereby, during the lock and switch shifting in which the first brake B1 is released and the second brake B2 is engaged, it is possible to prevent the oil in the hydraulic servo 45 and the oil ducts k1, k2, k3, and k4 from completely draining, and the controllability of the hydraulic servo 45 the next time that the first brake B1 is engaged is thereby improved. In addition, the accumulation of air in the first regulating valve 81 is suppressed by releasing the first brake B1, and the controllability of the hydraulic servo 45 the next time the first brake B1 engages is thereby improved.

Note that the other structures, operations, and effects of the hydraulic control apparatus $1_2$ for a transmission are identical to those of the hydraulic control apparatus $1_1$ for a transmission according to the first embodiment, and thus the explanation thereof has been omitted.

The third hydraulic switch $63_1$ that is used in the hydraulic control apparatus $1_1$ for a transmission according to the first embodiment is limited in that the line pressure $P_L$ is output from the output port 40f of the pressure regulating valve 40, and the line pressure $P_L$ is input whether the line pressure $P_L$ is in a high pressure state or a low pressure state (refer to FIG. 2).

Generally, as shown in FIG. 4, in a hydraulic switch, the threshold value, according to which the switch is turned from ON to OFF, varies within a range from the oil pressure A to the oil pressure B shown in the Figure due to the manufacturing tolerances. Thus, when, for example, a hydraulic switch that has a threshold value in the neighborhood of an oil pressure A is used as the third hydraulic switch $63_1$, advantageously the line pressure $P_L$LO in the low pressure state is set to OFF and the line pressure $P_L$HI in the high pressure state is set to ON. However, when, for example, a hydraulic switch that has a threshold in the neighborhood of an oil pressure B is used as the third hydraulic switch $63_1$, the rotation (input rotation) of the input shaft 17 increases accompanying an increase in the engine speed, and when the number of rotations of the mechanical oil pump 31 has increased and the discharged primary pressure is thereby increased, there is a concern, even when the line pressure is the line pressure $P_L$LO in the low pressure state, that the line pressure $P_L$ will be turned ON. In addition, even if, for example, a hydraulic switch having a threshold value in the neighborhood of an oil pressure A is selected, the threshold value may decrease due to long-term deterioration, and thus there also is a concern that the threshold value may drift to the neighborhood of the oil pressure B.

When the threshold value of the hydraulic switch that is used in this manner has drifted to the neighborhood of the oil pressure B, not only is it not possible to detect the high pressure state $P_L$HI of the line pressure $P_L$ accurately, but due to pulsating of the oil pressure from the oil pump, the line pressure $P_L$ may also pulsate, as shown by the wavy line in FIG. 4. Thus, the switch will be repeatedly turned ON and OFF in the neighborhood of the threshold value described above, and what is termed "hunting" will occur. Thereby, there is a concern that this will be a detrimental influence on the durability of the third hydraulic switch $63_1$.

Thus, in the hydraulic control apparatus $1_2$ for a transmission according to the second embodiment, the third hydraulic switch $63_2$ is disposed on the oil duct f9 via the oil duct m3, as described above, and the turning ON/OFF of the signal pressure $P_{S1}$ of the solenoid valve S1 is detected. In recent years, because there is substantially little chance that the pressure regulating valve 40 (the regulating valve that regulates the line pressure) will stick, if the signal pressure $P_{S1}$ is necessarily detected by the solenoid valve S1, the line pressure $P_L$ is regulated so as to attain a high pressure state $P_L$HI, that is, it is possible to detect the high pressure state $P_L$HI of the line pressure $P_L$ by detecting that the third hydraulic switch $63_2$ is ON.

According to the hydraulic control apparatus $1_2$ for a transmission according to the second embodiment of the present invention as described above, because the third hydraulic switch $63_2$ communicates with the output port S1b of the solenoid valve S1, it is possible to detect that the signal pressure $P_{S1}$ of the solenoid valve S1 is being output, and thereby, it is possible to detect that the solenoid valve S1 is being controlled normally and that the line pressure $P_L$ is in the high pressure state $P_L$HI. In addition, when the line pressure is in the low pressure state $P_L$LO, because the signal pressure $P_{S1}$ is not output from the solenoid valve S1 and the oil pressure is not produced in the third hydraulic switch $63_2$, it is possible to prevent the third hydraulic switch $63_2$ from hunting while in the state in which the line pressure $P_L$ increases because the oil pressure from the mechanical oil pump 31 has increased. Thereby, it is possible to improve the durability of the third hydraulic switch $63_2$.

In addition, because a first hydraulic switch 61 that communicates with the hydraulic servo 45 of the first brake B1 and the second hydraulic switch 62 that communicates with the hydraulic servo 47 of the second brake B2 are provided, it is possible to determine more accurately a failure state based on the ON/OFF state of the third hydraulic switch $63_2$ and the first and second hydraulic switches 61 and 62. In more detail, irrespective of whether the third hydraulic switch $63_2$ is ON and the line pressure $P_L$HI in a high pressure state is detected, it is possible to determine that the case in which the first hydraulic switch 61 and the second hydraulic switch 62 are both OFF is a failure state. Alternatively, when the third hydraulic switch $63_2$ is OFF and the line pressure is in the low pressure state $P_L$LO, it is possible to determine that even if the first hydraulic switch 61 and the second hydraulic switch 62 are both OFF, the state is not a failure state (i.e., that a hydraulic switch is damaged).

In addition, in the second embodiment of the present invention, because the third hydraulic switch $63_2$ does not hunt due to the rising of the line pressure when, in particular, the line pressure is in the low pressure state $P_L$LO, the line pressure is necessarily in the high pressure state $P_L$HI if the third hydraulic switch $63_2$ is ON, and the ON of the first and second hydraulic switches 61 and 62 can be disabled if the third hydraulic switch $63_2$ is OFF (i.e., the detection of the first and second hydraulic switches 61 and 62 is not carried out). Thus, even if the first and second hydraulic switches 61 and 62 are turned ON due to the rising of the line pressure when the line pressure is in a low pressure state $P_L$LO, it is possible to assume that this state is not a failure state (i.e., a hydraulic switch is damaged).

Note that similarly to the first embodiment, in the shift apparatus 14 in the present embodiment, the first brake B1 and the second brake B2 do not simultaneously engage during normal operation, and thus even when the first hydraulic switch 61 and the second hydraulic switch 62 are both ON, it is possible to determine that the state is a failure state.

Note that the first and second embodiments were explained as a hydraulic control apparatus for a transmission in a hybrid drive apparatus 10 in which the rotation of the second electric motor 13 is transferred to an output shaft 18 to shift between two speeds, a high speed and a low speed. However, this is not limiting, and as long as a line pressure is regulated so as to attain a low pressure state and a high pressure state, the present invention can be applied to any type of transmission, irrespective of whether the transmission is a staged transmission or a non-staged type transmission.

According to a first aspect of the present invention, because a high pressure state detecting device is provided that detects that a line pressure regulating device is outputting a line pressure in a high pressure state, it is possible to detect whether the line pressure from the line pressure regulating device is being regulated and controlled so as to attain a high pressure state. Thereby, it is possible to prevent an operation of a transmission that is designed to be carried out when the line pressure is in a high pressure state from malfunctioning when the line pressure remains in a low pressure state.

According to a second aspect of the present invention, because the switching of the engagement states of friction engaging elements starts after the high pressure state detecting device has detected the output of a line pressure in a high pressure state, it is possible to prevent the occurrence of slipping and abrupt engagement due to the switching of the engagement states of friction engaging elements being carried out when the line pressure is in a low pressure state, and it is possible to prevent transmission shock from occurring.

According to a third aspect of the present invention, because the engine is restarted after the high pressure detecting device has detected the output of a line pressure in a high pressure state, it is possible to prevent, for example, the second motor from racing due to the restarting of the engine being carried out while the line pressure is in a low pressure state and a reaction force of the second motor is not transferred.

According to a fourth aspect of the invention, by controlling the solenoid valves, it is possible to carry out switching control in which the line pressure is switched to a low pressure state or a high pressure state.

According to a fifth aspect of the present invention, it is possible to set the line pressure to a low pressure state by not outputting the signal pressures of the solenoid valves, and it is possible to set the line pressure to a high pressure state by outputting the signal pressures of the solenoid valves.

According to a sixth aspect of the present invention, because the high pressure detecting device is a hydraulic switch that directly communicates with the output ports of the regulating valves, it is possible, for example, to detect the high pressure state of the line pressure without being influenced by the other valves sticking or the like.

According to a seventh aspect of the present invention, because the high pressure detecting device is a hydraulic switch that communicates with the output port of the solenoid valves, the solenoid valves are controlled normally, and it is possible to detect that the line pressure is in the high pressure state. In addition, when the line pressure is in a low pressure state, because a signal pressure is not output by the solenoid valves and oil pressure is not generated in the hydraulic switches, when the line pressure rises because the oil pressure from the oil pump is rising, it is possible to prevent the hydraulic switches from hunting. Thereby, it is possible to improve the durability of the hydraulic switches.

According to an eighth aspect of the present invention, because a plurality of engagement pressure hydraulic switches is provided that respectively communicate with the plurality of hydraulic servos, it is possible to diagnose a failure state based on the ON/OFF state of the hydraulic switches and the engagement pressures hydraulic switches described above.

What is claimed is:

1. A hydraulic control apparatus for a transmission, comprising
    a line pressure regulating device that enables control in which an oil pressure from an oil pump is regulated so as to attain a line pressure, and that enables control in which the line pressure is switched stepwise between a low pressure state in a lower pressure range and a high pressure state in a higher pressure range;
    a plurality of hydraulic servos that engage and disengage friction engaging elements using engagement pressures that are based on the line pressure; and
    a high pressure state detecting device that detects that the line pressure regulating device is outputting the line pressure in the high pressure state.

2. The hydraulic control apparatus for the transmission according to claim 1, wherein:
    the line pressure regulating device carries out control in which the line pressure is switched to the high pressure state before switching engagement states of each of the friction engaging elements starts, and starts switching the engagement states of each of the friction engaging elements after the high pressure detecting device has detected the output of the line pressure in the high pressure state.

3. The hydraulic control apparatus for the transmission according to claim 2, that is used in a hybrid drive apparatus that is provided with an input shaft that is connected to an engine, a first motor, an output shaft, a power distributing planetary gear in which drive linkages are established between the input shaft, the first motor, and the output shaft at each rotating element, and the transmission is interposed between the second motor and the output shaft, wherein:

the friction engaging elements connect the second motor and the output shaft to enable a transfer of a drive force when engaged; and the line pressure regulating device carries out control in which the line pressure is switched to the high pressure state before the engine is restarted by a rotating drive of the first motor using an output of the second motor as a reaction force, and restarts the engine after the high pressure detecting device has detected an output of the line pressure in the high pressure state.

4. The hydraulic control apparatus for the transmission according to claim 2, wherein:

the line pressure regulating device comprises a regulating valve that regulates the oil pressure from the oil pump so as to attain the line pressure, and a solenoid valve that can output a signal pressure; and the regulating valve carries out control in which the line pressure is switched between the low pressure state and the high pressure state based on the signal pressure of the solenoid valve.

5. The hydraulic control apparatus for the transmission according to claim 4, wherein:

the regulating valve comprises a spool, an urging device that urges the spool in one direction, a working oil chamber that inputs signal pressures from the solenoid valve by overcoming an urging force of the urging device, input ports that are connected to a discharge side of the oil pump, line pressure output ports that output the line pressure, and a reduction port that is connected to a suction side of the oil pump;

the spool is controlled based on the urging force of the urging device so as to attain a position in which the input ports, the reduction port, and the line pressure output ports communicate and the line pressure is in the low pressure state when the signal pressure of the solenoid valve is not output; and the spool is controlled based on the signal pressure of the solenoid valve that is input to the working oil chamber so as to attain a position at which the input ports and the line pressure output ports communicate, and the input ports and the reduction ports are interrupted and the line pressure attains the high pressure state when the signal pressure of the solenoid valve is output.

6. The hydraulic control apparatus for the transmission according to claim 5, wherein the high pressure detecting device is a hydraulic switch that directly communicates with the line pressure output port of the regulating valve.

7. The hydraulic control apparatus for the transmission according to claim 6, comprising a plurality of engagement pressure hydraulic switches that each communicate with a plurality of hydraulic servos.

8. The hydraulic control apparatus for the transmission according to claim 5, wherein the high pressure detecting device is a hydraulic switch that inputs the signal pressure of the solenoid valve.

9. The hydraulic control apparatus for the transmission according to claim 8, comprising a plurality of engagement pressure hydraulic switches that each communicate with a plurality of hydraulic servos.

10. The hydraulic control apparatus for the transmission according to claim 4, wherein the high pressure detecting device is a hydraulic switch that inputs the signal pressure of the solenoid valve.

11. The hydraulic control apparatus for the transmission according to claim 10, comprising a plurality of engagement pressure hydraulic switches that each communicate with a plurality of hydraulic servos.

12. The hydraulic control apparatus for the transmission according to claim 1, that is used in a hybrid drive apparatus that is provided with an input shaft that is connected to an engine, a first motor, an output shaft, a power distributing planetary gear in which drive linkages are established between the input shaft, the first motor, and the output shaft at each rotating element, and the transmission is interposed between the second motor and the output shaft, wherein:

the friction engaging elements connect the second motor and the output shaft to enable a transfer of a drive force when engaged; and the line pressure regulating device carries out control in which the line pressure is switched to the high pressure state before the engine is restarted by a rotating drive of the first motor using an output of the second motor as a reaction force, and restarts the engine after the high pressure detecting device has detected an output of the line pressure in the high pressure state.

13. The hydraulic control apparatus for the transmission according to claim 1, wherein:

the line pressure regulating device comprises a regulating valve that regulates the oil pressure from the oil pump so as to attain the line pressure, and a solenoid valve that can output a signal pressure; and the regulating valve carries out control in which the line pressure is switched between the low pressure state and the high pressure state based on the signal pressure of the solenoid valve.

14. The hydraulic control apparatus for the transmission according to claim 13, wherein:

the regulating valve comprises a spool, an urging device that urges the spool in one direction, a working oil chamber that inputs signal pressures from the solenoid valve by overcoming an urging force of the urging device, input ports that are connected to a discharge side of the oil pump, line pressure output ports that output the line pressure, and a reduction port that is connected to a suction side of the oil pump;

the spool is controlled based on the urging force of the urging device so as to attain a position in which the input ports, the reduction port, and the line pressure output ports communicate and the line pressure is in the low pressure state when the signal pressure of the solenoid valve is not output; and the spool is controlled based on the signal pressure of the solenoid valve that is input to the working oil chamber so as to attain a position at which the input ports and the line pressure output ports communicate, and the input ports and the reduction ports are interrupted and the line pressure attains the high pressure state when the signal pressure of the solenoid valve is output.

15. The hydraulic control apparatus for the transmission according to claim 14, wherein the high pressure detecting device is a hydraulic switch that directly communicates with the line pressure output port of the regulating valve.

16. The hydraulic control apparatus for the transmission according to claim 15, comprising a plurality of engagement pressure hydraulic switches that each communicate with a plurality of hydraulic servos.

17. The hydraulic control apparatus for the transmission according to claim 14, wherein the high pressure detecting device is a hydraulic switch that inputs the signal pressure of the solenoid valve.

18. The hydraulic control apparatus for the transmission according to claim 17, comprising a plurality of engagement pressure hydraulic switches that each communicate with a plurality of hydraulic servos.

19. The hydraulic control apparatus for the transmission according to claim 13, wherein the high pressure detecting device is a hydraulic switch that inputs the signal pressure of the solenoid valve.

20. The hydraulic control apparatus for the transmission according to claim 19, comprising a plurality of engagement pressure hydraulic switches that each communicate with a plurality of hydraulic servos.

* * * * *